US011485062B2

(12) United States Patent
Chen et al.

(10) Patent No.: US 11,485,062 B2
(45) Date of Patent: Nov. 1, 2022

(54) APPARATUS FOR FORMING AN ENCAPSULATED STRIP

(71) Applicant: The Goodyear Tire & Rubber Company, Akron, OH (US)

(72) Inventors: Hongbing Chen, Broadview Heights, OH (US); Adam Mark Baldan, Copley, OH (US); Christopher David Dyrlund, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 228 days.

(21) Appl. No.: 16/596,873

(22) Filed: Oct. 9, 2019

(65) Prior Publication Data

US 2020/0198208 A1    Jun. 25, 2020

Related U.S. Application Data

(60) Provisional application No. 62/781,757, filed on Dec. 19, 2018.

(51) Int. Cl.
*B29C 48/30*    (2019.01)
*B29C 48/21*    (2019.01)
*B29D 30/06*    (2006.01)
*B29C 48/37*    (2019.01)

(52) U.S. Cl.
CPC ............ *B29C 48/304* (2019.02); *B29C 48/21* (2019.02); *B29C 48/37* (2019.02); *B29D 30/0681* (2013.01); *B29D 2030/0682* (2013.01)

(58) Field of Classification Search
CPC ....... B29C 48/304; B29C 48/21; B29C 48/37; B29C 48/022; B29C 48/387; B29C 48/49; B29C 48/07; B29D 30/0681; B29D 2030/0682; B29D 30/30
See application file for complete search history.

(56) References Cited

U.S. PATENT DOCUMENTS

| 3,268,970 | A | * | 8/1966 | Kelly | .................... B29C 48/06 |
| | | | | | 425/131.1 |
| 3,448,183 | A | | 6/1969 | Chisholm | |
| 3,485,912 | A | | 12/1969 | Schrenk et al. | |
| 3,584,343 | A | * | 6/1971 | Kohlepp | ................ B29C 48/19 |
| | | | | | 425/327 |

(Continued)

FOREIGN PATENT DOCUMENTS

| DE | 3010691 A1 | 9/1981 |
| DE | 10201422316 | 5/2016 |

(Continued)

OTHER PUBLICATIONS

Translation of Chinese Search Report for Serial No. 201911317854.1 dated Jun. 3, 2021.

(Continued)

*Primary Examiner* — Nahida Sultana
(74) *Attorney, Agent, or Firm* — Katherine A. Smith; June E. Rickey (57) ABSTRACT

One or more embodiments of the present invention provide an apparatus for forming a continuous strip of a first compound that is encapsulated by a second compound. The apparatus allows the mixture ratio of the first compound to the second compound to vary. The first compound may be a sealant, and the second compound may be a rubber.

8 Claims, 9 Drawing Sheets

(56) References Cited

U.S. PATENT DOCUMENTS

| | | | |
|---|---|---|---|
| 4,359,078 A | 11/1982 | Egan | |
| 4,832,590 A * | 5/1989 | Bellmer | B29C 48/256 |
| | | | 425/185 |
| 6,447,875 B1 | 9/2002 | Norquist et al. | |
| 6,837,287 B2 | 1/2005 | Smith, Sr. et al. | |
| 2005/0113502 A1 | 5/2005 | Fitzharris et al. | |
| 2012/0160388 A1 | 6/2012 | Kaes et al. | |
| 2012/0161366 A1 * | 6/2012 | Burg | B29C 48/37 |
| | | | 264/331.11 |
| 2015/0090381 A1 | 4/2015 | Shimomura | |
| 2016/0059466 A1 | 3/2016 | Dyrlund et al. | |
| 2017/0043520 A1 | 2/2017 | Maia et al. | |
| 2018/0079264 A1 | 3/2018 | Ruegg et al. | |
| 2018/0093406 A1 | 4/2018 | De Bruijn et al. | |
| 2018/0370074 A1 * | 12/2018 | Ougier | B29C 48/402 |
| 2019/0152116 A1 | 5/2019 | Dyrlund et al. | |
| 2020/0070396 A1 * | 3/2020 | Stephens | B29C 48/16 |
| 2020/0198205 A1 * | 6/2020 | Chen | B29C 48/307 |
| 2020/0198206 A1 * | 6/2020 | Dyrlund | B29C 48/25686 |

FOREIGN PATENT DOCUMENTS

| | | |
|---|---|---|
| JP | 2002103413 A | 4/2002 |
| JP | 2017170681 A | 9/2017 |
| WO | 9212857 A1 | 8/1992 |

OTHER PUBLICATIONS

European Search Report for Serial No. EP19217291 dated May 26, 2020.

E. Weller et al, Extrusion of Very Thin Films and Composite Films, Nov. 30, 1980, 67, China Financial and Economic Press.

Walter Michaeli, Extrusion Dies for Plastics and Rubber, May 31, 2000, 108, China Light Industry Press Ltd, Munich.

Search for Chinese Serial No. 201911317854 dated Aug. 19, 2022.

Search for European Serial No. 19217291 dated Aug. 3, 2022.

* cited by examiner

APPARATUS FOR FORMING AN ENCAPSULATED STRIP

FIELD OF THE INVENTION

The invention relates in general to tire manufacturing, and more particularly to an apparatus for forming a tire component, particularly a continuous strip of a first elastomer that is encapsulated by a second elastomer, and more particularly, to an encapsulated strip of sealant material.

BACKGROUND OF THE INVENTION

Pneumatic tires with puncture sealing properties are known to those skilled in the tire art. Typically, such tires include a layer of sealant typically applied or sprayed on the inside of the tire. The sealant may also be placed with the inner liner and ply. The problem with a sealant layer is that the sealant may migrate during high speed operation of the tire due to centrifugal forces. Thus, it is desired to have an improved method and apparatus for forming an encapsulated sealant for installation on the inside of the tire.

Definitions

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers.

"Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Laminate structure" means an unvulcanized structure made of one or more layers of tire or elastomer components such as the innerliner, sidewalls, and optional ply layer.

BRIEF DESCRIPTION OF THE DRAWINGS

The invention will be described by way of example and with reference to the accompanying drawings in which:

FIG. 5A illustrates a 50-50 encapsulated strip, while

DETAILED DESCRIPTION OF THE INVENTION

Figure 1:
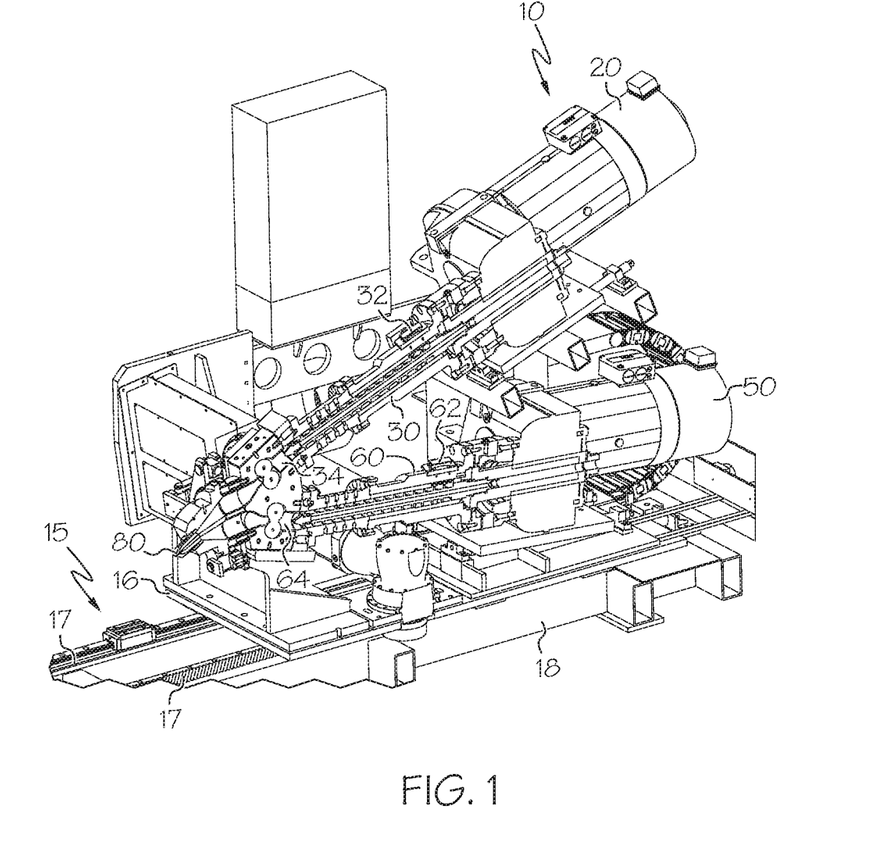
FIG. 1 is a schematic of a dual compound strip forming apparatus.
Figure 5A:
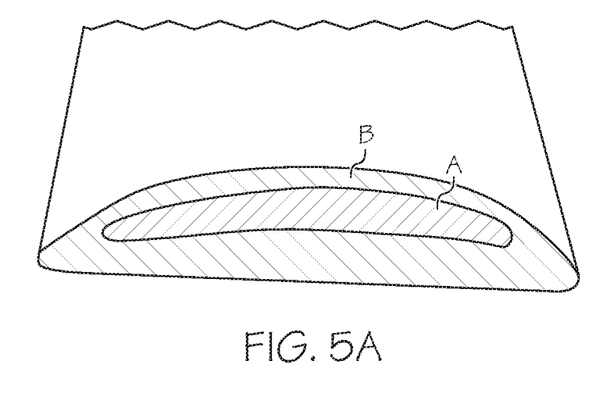
Figure 5B:
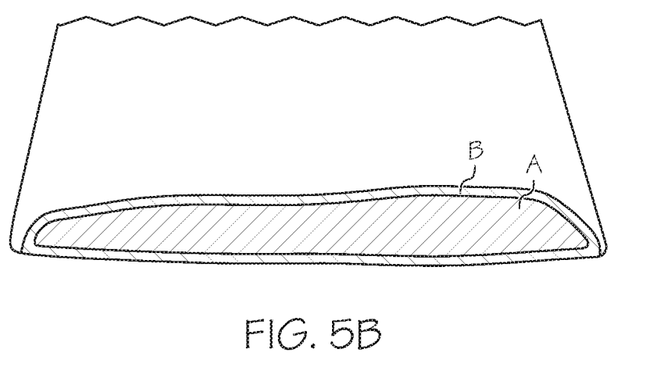
FIG. 5B illustrates a 90-10 encapsulated strip.
Figure 6A:
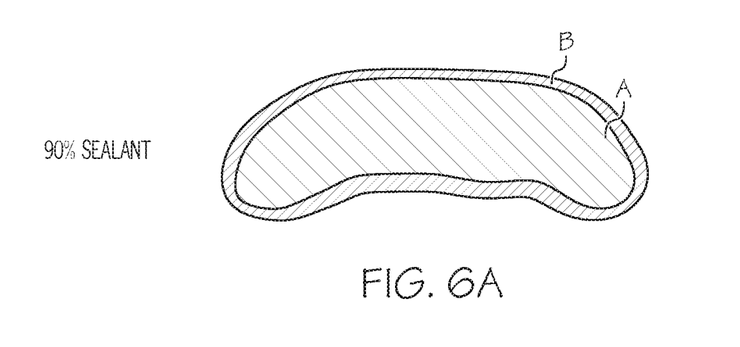
FIG. 6A illustrates an encapsulated strip with a 90% sealant 10% outer layer.
Figure 6B:
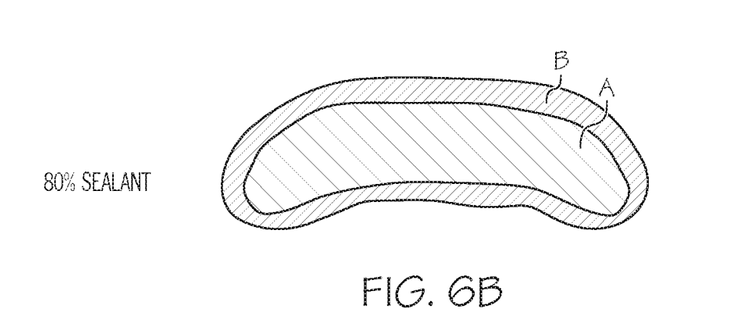
FIG. 6B illustrates an encapsulated strip with an 80% sealant 20% outer layer.
Figure 6C:
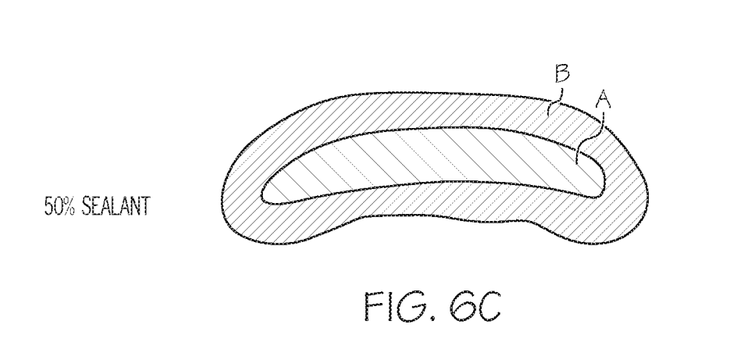
FIG. 6C illustrates an encapsulated strip with a 50% sealant 50% outer layer.

FIG. 1 illustrates a first embodiment of a dual compound strip forming apparatus 10 suitable for use for making a continuous co-extruded strip of a first rubber compound A such as a sealant, that is encapsulated in a second rubber compound B as shown in FIGS. 5-6. The dual compound strip forming apparatus 10 is not limited to tire applications and may be used for example, to make other rubber components not related to tires such as conveyors, hoses, belts, etc. The dual compound strip forming apparatus 10 may be provided directly at the tire or component building station for direct application of the rubber composition to a tire, component, or other component building apparatus.

The dual compound strip forming apparatus 10 is mounted upon a translatable support bar 16 that is slidable fore and aft on parallel rails 17 of a support frame 18 so that the dual compound strip forming apparatus 10 can translate fore and aft in relation to a tire building machine (not shown).

As shown in FIG. 1, the dual compound strip forming apparatus 10 includes a first extruder 30 and a second extruder 60, preferably arranged side by side as shown. The first extruder 30 has an inlet 32 for receiving a first rubber composition A as described in more detail, below. The first extruder 30 is driven by motor 20. The second extruder 60 has an inlet 62 for receiving a second rubber composition B as described in more detail, below. The second extruder 60 is driven by electrical motor 50. The first or second extruder 30,60 may comprise any commercial extruder suitable for processing of rubber or elastomer compounds. The extruder may comprise a commercially available extruder commonly known by those skilled in the art as a pin type extruder, a twin screw or a single screw extruder, or a ring type of extruder. Preferably, the extruder has a length to diameter ratio (L/D) of about 5, but may range from about 3 to about 20. A pin type of extruder is preferred, but is not limited to same.

The first extruder inlet 32 receives a first compound A, examples of which are described in more detail, below. The first extruder 30 functions to warm up a first compound A to the temperature in the range of about 80° C. to about 150° C., preferably about 90° C. to about 120° C., and to masticate the rubber composition as needed. The output end 34 of the first extruder 30 is connected to an inlet end 43 of a first gear pump 42. Compound A is thus first extruded by the first extruder 30 and then pumped by the first gear pump 42 into a nozzle 80. The first gear pump 42 functions as a metering device and a pump and may have gears such as planetary gears, bevel gears or other gears.

Figure 2A:
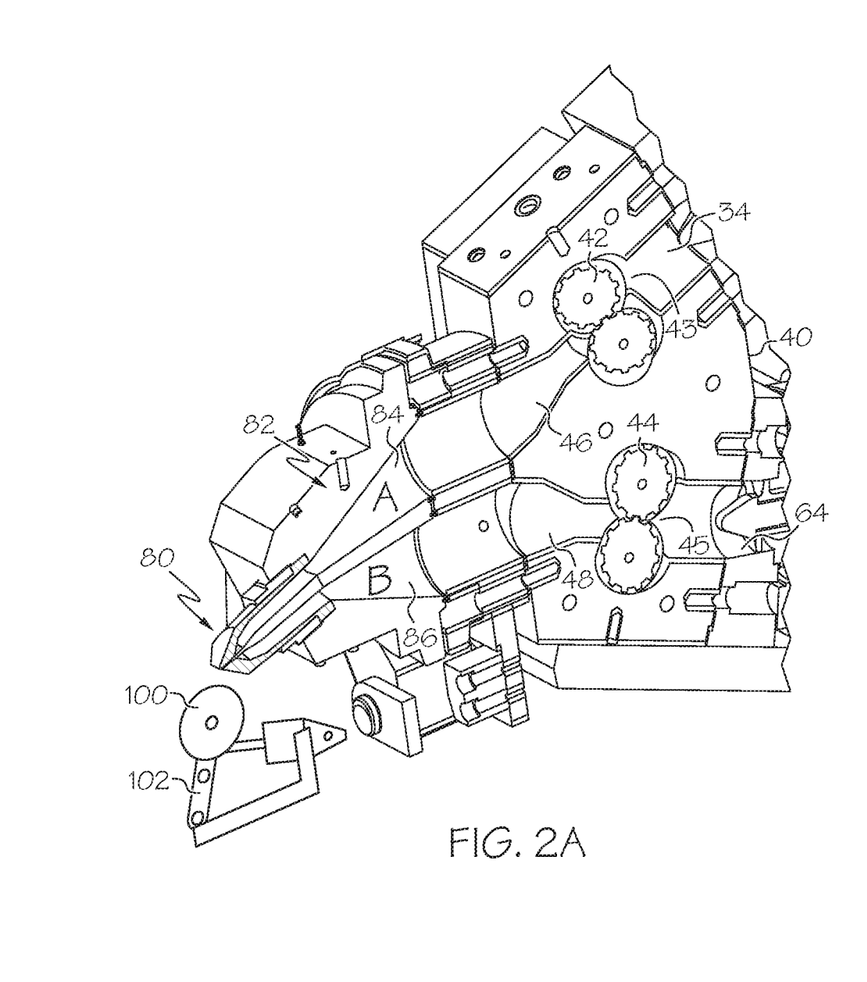
FIG. 2A is a close up view of a nozzle of the compound strip forming apparatus of FIG. 1.
Figure 2B:
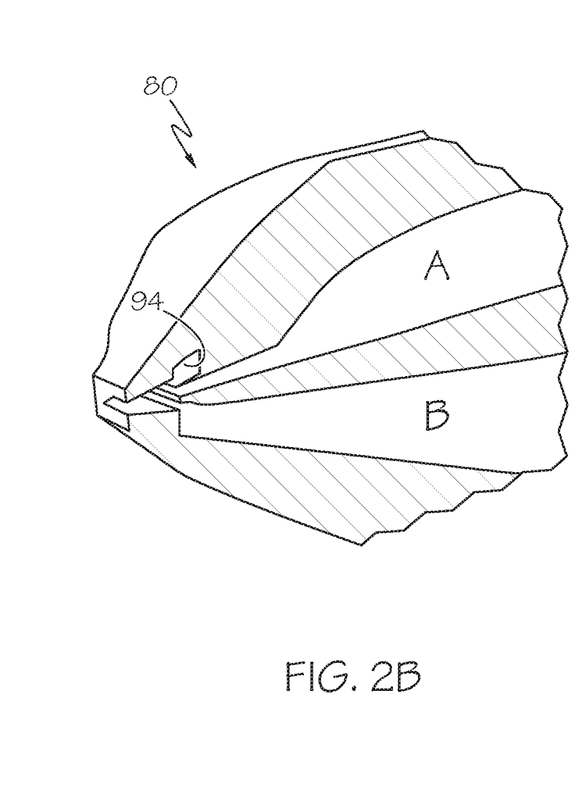
FIG. 2B is a close up view of the nozzle outlet.

The second extruder inlet 62 receives a second compound B, examples of which are described in more detail, below. The second extruder 60 functions to warm up the second compound B to the temperature in the range of about 80° C. to about 150° C., preferably about 90° C. to about 120° C., and to masticate the rubber composition as needed. The output end 64 of the second extruder 60 is connected to an inlet end 45 of a second gear pump 44 as shown in FIG. 2A. Compound B is thus extruded by the second extruder 60 and then pumped by the second gear pump 44, which functions as a metering device and a pump and may have gears such as planetary gears, bevel gears or other gears.

Figure 3A:
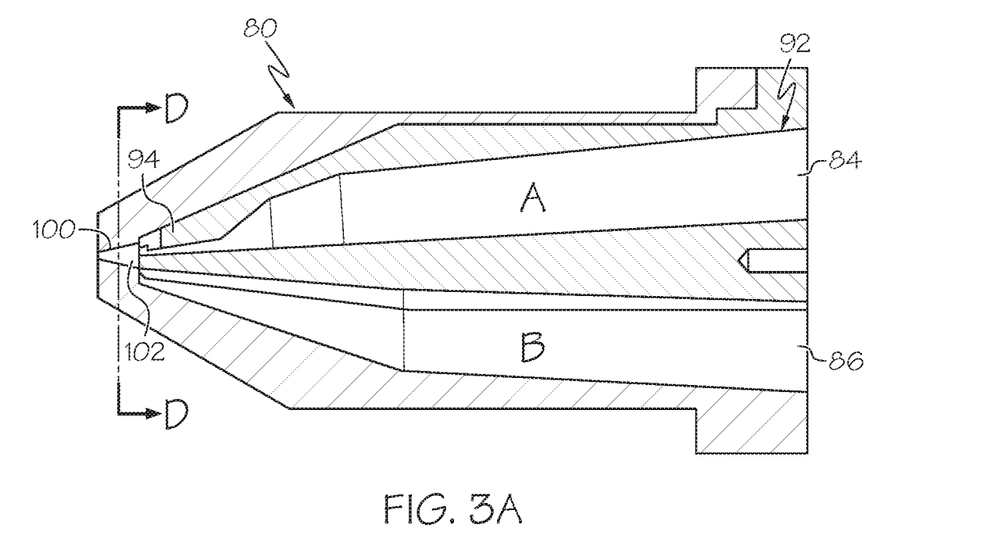
FIG. 3A is a side cross-sectional view of the nozzle of FIG. 2B.
Figure 3B:
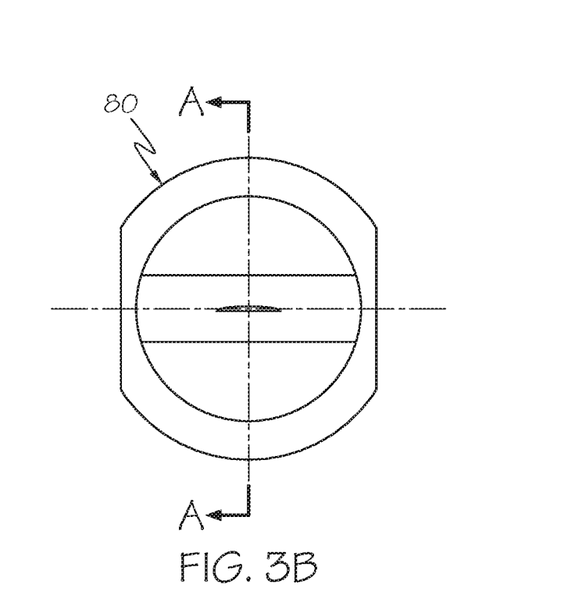
FIG. 3B is a front view of the nozzle of FIG. 3A.
Figure 3C:
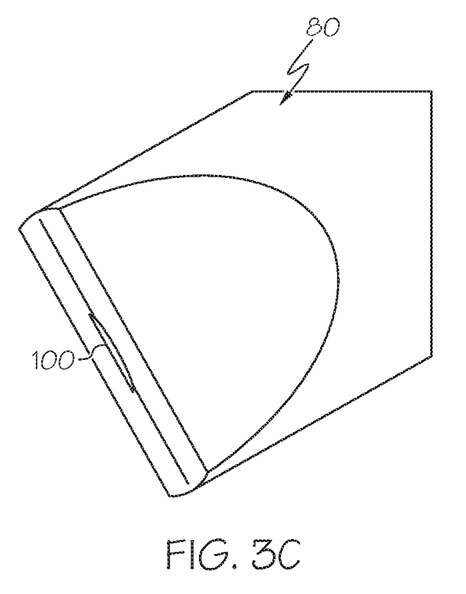
FIG. 3C is a side perspective view of the nozzle of FIG. 3A.
Figure 3D:
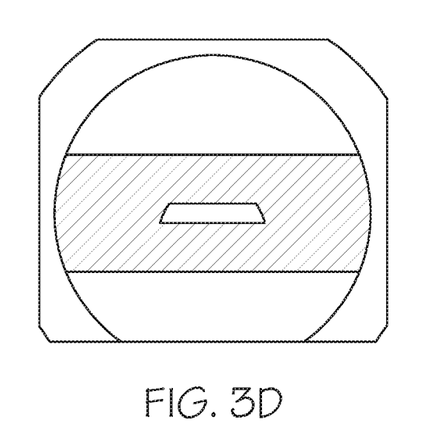
FIG. 3D is a cross section along the lines D-D of FIG. 3A.
Figure 3E:
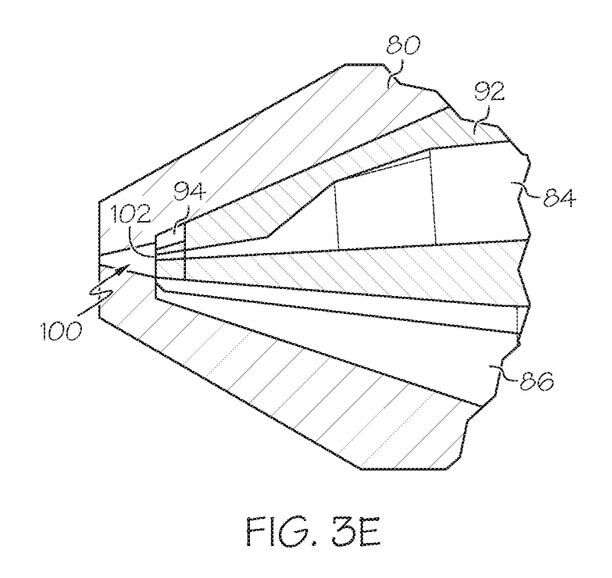
FIG. 3E is a close up view of the circled portion of FIG. 3A.
Figure 3F:
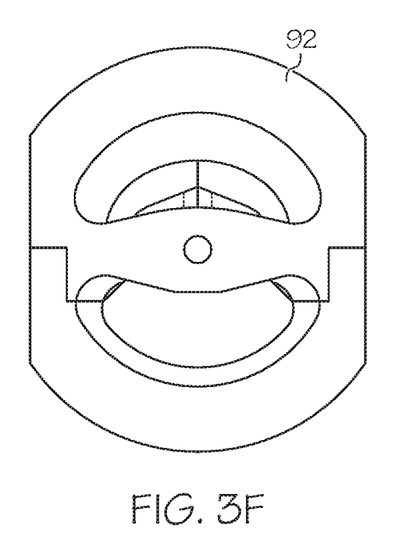
FIG. 3F is a rear view of the nozzle.
Figure 4A:
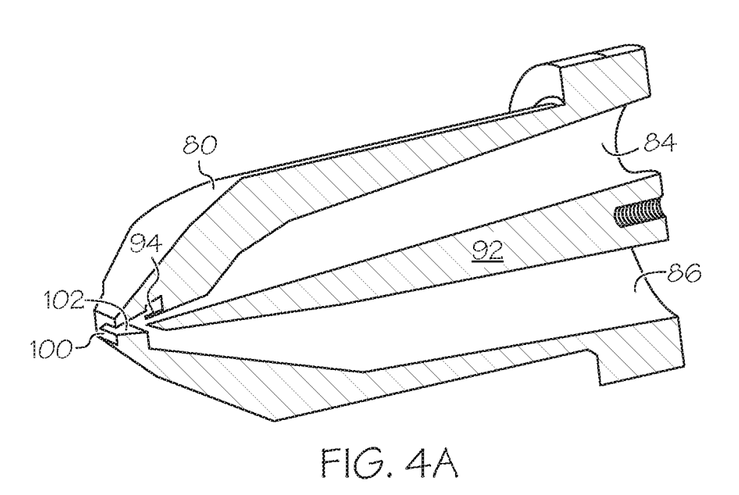
FIG. 4A is a cross-sectional view of a nozzle of the present invention.
Figure 4B:
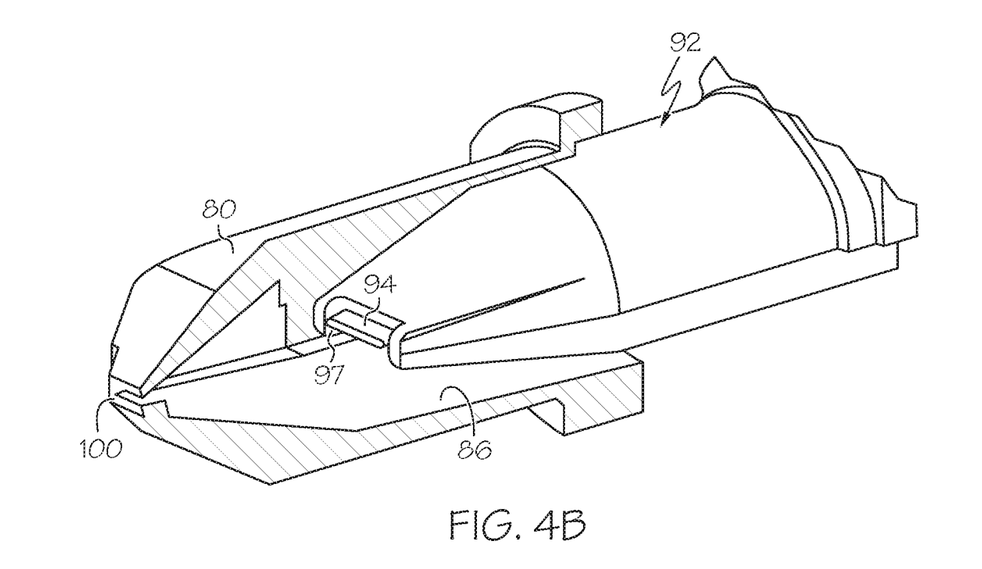
FIG. 4B is a cross-sectional view of a nozzle and removable insert.
Figure 4C:
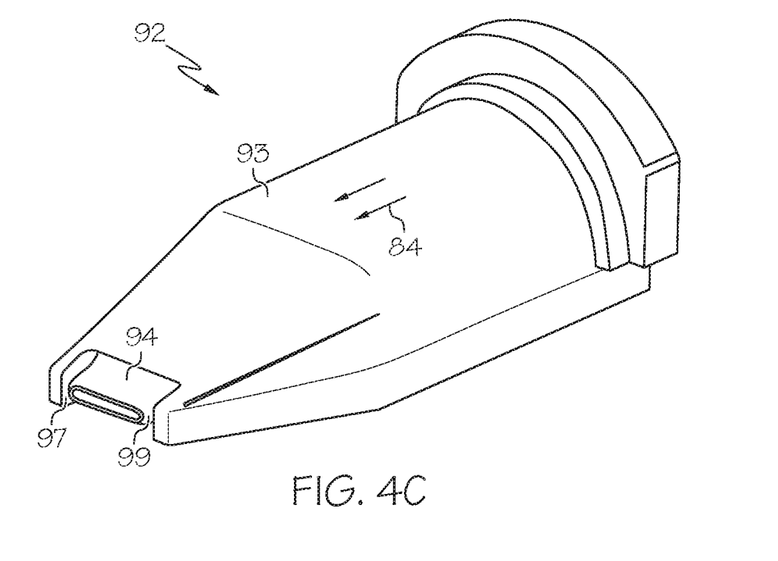
FIG. 4C is a top perspective view of a removable insert.
Figure 4D:
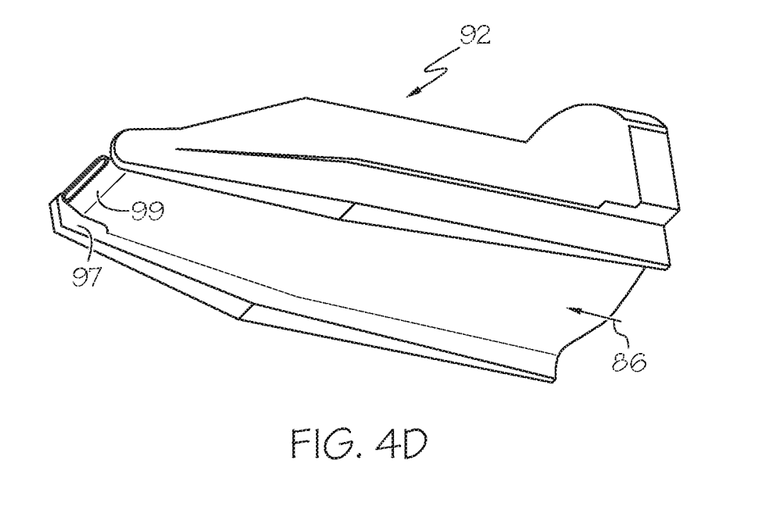
FIG. 4D is a bottom perspective view of a removable insert.

The first and second gear pumps 42,44 may be housed in a single housing 40 and are placed in close proximity to each other so that the outlet channels 46,48 of the first and second gear pumps are also in close proximity, as shown in FIG. 2A. The gear pump outlet channels 46,48 are fed into respective first and second nozzle channels 84,86 of nozzle 80. FIG. 3A illustrates a cross-sectional side view of the nozzle 80. The first and second nozzle channels 84,86 are formed by a removable insert 92 that is used to separate the internal flow passageways 88,90. FIG. 4C illustrates the upper surface 93 of the removable insert 92 that forms the first nozzle channel 84 that flows the compound A to be encapsulated. The removable insert 92 has an upper surface that terminates in an elongated flat portion 94 that is located at the entrance to the die 102. There are two slits or short passageways 97,99 on each side of the elongated flat portion 94 of the insert that facilitates the encapsulation flow of compound B around compound A.

The first and second nozzle channels 84,86 remain separated from each other so that the two rubber flow streams do not merge until just upstream of the exit of the nozzle. At the entrance to the flow die 102, the compound B flow stream flows around the compound A stream so that a continuous strip of compound A is encapsulated by a thin skin of compound B. Thus, the flow streams of compound A and B do not mix together.

Thus, the apparatus of the invention produces an encapsulated continuous strip of compound A that is encapsulated by skin of compound B. An example strip is shown in FIG. 5B, with the sealant being 90% of the mixture and being encapsulated by an outer shell or skin of 10% by volume of the mixture. FIG. 5A illustrates 50% of the sealant being encapsulated by an outer shell of 50% by volume of the mixture. FIGS. 6A-6C illustrate side by side comparison of varying amounts of sealant.

The volume ratio of compound A to compound B may be altered, as shown in FIG. 6A with 90% compound A, 10% compound B, while FIG. 6B illustrates 80% compound A, 20% compound B, and FIG. 6C illustrates 50% A, 50% B. The volume ratio of A to B is varied by varying the ratio of the speed of gear pump A to gear pump B.

In one embodiment, the sealant material suitable for use is described in U.S. Pat. No. 4,359,078, or U.S. Pat. No. 6,837,287, or U.S. application Ser. No. 10/917,620, which is hereby incorporated by reference. The outer skin material is selected to bond readily to the inner liner or other layers of the tire. Preferably, the skin material has the same composition as one of the tire components to which the sealant strip is bonded to.

A method for forming a continuous strip of compound of a first compound A encapsulated by a second compound B comprises the steps of: extruding a first compound A through a first extruder and then pumping the first compound A through a first gear pump and into a first passageway of a nozzle, extruding a second compound B through a second extruder and then pumping the second compound B through a second gear pump and into a second passageway of a nozzle, wherein the first and second passageways are joined together at the inlet of the die outlet of a nozzle. Preferably, the first and second compound exit the die outlet of the nozzle wherein the first compound is encapsulated by the second compound. The nozzle preferably has a removable insert which divides the nozzle into a separated first and second passageway, wherein the removable insert has a distal end for positioning adjacent a die outlet of the nozzle, wherein the distal end has an elongated flat portion. Preferably there are slits located on each end of the elongated flat portion to facilitate encapsulation of the flow. More preferably, the ratio of the volume of the encapsulated rubber to the volume of the skin is varied by changing the ratio of the speed of the first gear pump to the second gear pump.

A rotatable stitcher roller 100 is mounted adjacent the nozzle outlet of the nozzle assembly 80. The stitcher roller is pivotally mounted upon a support stand 102. An actuator connected to the stitcher roller pivots or rotates the support stand about its end when actuated.

Variations in the present inventions are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An apparatus for forming a continuous strip of a first compound A encapsulated by a second compound B, the apparatus comprising:
 a first extruder for extruding a first compound A, and having an outlet connected to a first gear pump;
 a second extruder for extruding a second compound B, and having an outlet connected to a second gear pump;
 wherein the outlet of the first gear pump and the outlet of the second gear pump are fed into respective first and second passageways of a nozzle, wherein the first and second passageways are separate from each other upstream of an outlet of the nozzle;
 the nozzle having an insert for forming the first and second passageways in the nozzle; and
 wherein the insert has a distal end for positioning at the outlet of the nozzle, wherein the distal end has an elongated flat portion, wherein the insert has a circular cross section at an inlet end that transitions to a rectangular cross section at the outlet forming an elongated flat rectangular portion.

2. The apparatus of claim 1 wherein there are slits located on each end of the elongated flat portion of the insert to facilitate encapsulation of the flow at an entrance to a die at the outlet of the nozzle.

3. The apparatus of claim 1 wherein the insert is removable from the nozzle.

4. The apparatus of claim 1 wherein the distal end of the insert is positioned adjacent a die outlet of the nozzle.

5. The apparatus of claim 1 wherein the insert has a tapered upper surface.

6. The apparatus of claim 1 wherein the ratio of the first gear pump to the second gear pump may be varied during operation of the system.

7. The apparatus of claim 1 wherein the elongated flat portion of the insert is positioned at the inlet to a die of the nozzle.

8. The apparatus of claim 1 wherein the insert has a flat bottom portion forming a channel.

* * * * *